United States Patent
Tamaoki et al.

(10) Patent No.: US 11,620,833 B2
(45) Date of Patent: Apr. 4, 2023

(54) VEHICLE DRIVING SUPPORT DEVICE

(71) Applicant: TOYOTA JIDOSHA KABUSHIKI KAISHA, Toyota (JP)

(72) Inventors: Tomoyasu Tamaoki, Kazaki (JP); Yusuke Tatesumi, Seto (JP); Ruiko Ito, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 155 days.

(21) Appl. No.: 17/364,846

(22) Filed: Jun. 30, 2021

(65) Prior Publication Data

US 2022/0092315 A1 Mar. 24, 2022

(30) Foreign Application Priority Data

Sep. 23, 2020 (JP) .............................. JP2020-158378

(51) Int. Cl.
  *G06V 20/56* (2022.01)
  *B60W 50/14* (2020.01)
  *B60R 1/22* (2022.01)
  *B60R 1/24* (2022.01)

(52) U.S. Cl.
  CPC ................ *G06V 20/56* (2022.01); *B60R 1/22* (2022.01); *B60R 1/24* (2022.01); *B60W 50/14* (2013.01); *B60R 2300/30* (2013.01); *B60W 2050/146* (2013.01); *B60W 2420/42* (2013.01); *B60W 2554/4048* (2020.02)

(58) Field of Classification Search
  CPC .............................................. B60W 2554/4048
  See application file for complete search history.

(56) References Cited

U.S. PATENT DOCUMENTS

| | | | |
|---|---|---|---|
| 6,681,163 B2 * | 1/2004 | Stam ...................... | G06V 20/56 250/227.25 |
| 6,792,161 B1 * | 9/2004 | Imaizumi ............... | G01N 21/94 358/463 |
| 7,196,305 B2 * | 3/2007 | Shaffer ................. | G06T 7/0002 250/221 |

(Continued)

FOREIGN PATENT DOCUMENTS

| | | | | |
|---|---|---|---|---|
| CN | 102883925 A | * | 1/2013 | ............ B60S 1/0844 |
| CN | 103917986 A | * | 7/2014 | ............... B60R 1/10 |

(Continued)

*Primary Examiner* — Kevin R Steckbauer
(74) *Attorney, Agent, or Firm* — Dickinson Wright, PLLC

(57) ABSTRACT

A vehicle driving support device performs extraneous matter notification for notifying an occupant of a vehicle that extraneous matter is adhered to a viewing-angle window part which is a part of a window of the vehicle in a viewing angle range of an onboard camera which is mounted in the vehicle such that an outside view from the vehicle is imaged from the inside of the vehicle or a camera lens which is a lens of the onboard camera, performs a process of detecting the extraneous matter adhering to the viewing-angle window part or the camera lens when the vehicle is stopped, and does not perform the extraneous matter notification even if the extraneous matter adhering to the viewing-angle window part or the camera lens is detected when the vehicle is stopped and is not in a state in which the vehicle is predicted to be about to start traveling.

8 Claims, 4 Drawing Sheets

(56) References Cited

U.S. PATENT DOCUMENTS

| | | | | |
|---|---|---|---|---|
| 7,609,857 B2* | 10/2009 | Franz | ................... | B60S 1/0822 382/104 |
| 7,619,668 B2* | 11/2009 | Saka | ................... | G03B 43/00 348/125 |
| 7,944,362 B2* | 5/2011 | Hue | ................... | G06T 7/0008 340/602 |
| 8,243,166 B2* | 8/2012 | Kumar | ............... | H04N 1/00037 348/229.1 |
| 8,553,088 B2* | 10/2013 | Stein | ................... | B60R 1/00 382/104 |
| 8,913,133 B2* | 12/2014 | Huelsen | ................. | G01N 21/47 348/148 |
| 9,064,317 B2* | 6/2015 | Liu | ................... | G06T 7/11 |
| 9,126,534 B2* | 9/2015 | Snider | ................... | B60R 11/04 |
| 9,128,813 B2* | 9/2015 | Almedia | ................ | B60Q 1/20 |
| 9,224,051 B2* | 12/2015 | Irie | ................... | G06T 7/0002 |
| 9,224,055 B2* | 12/2015 | Kido | ................... | G06V 20/56 |
| 9,245,333 B1 | 1/2016 | Beck | ................... | G06V 20/56 |
| 9,319,637 B2* | 4/2016 | Lu | ................... | H04N 7/18 |
| 9,409,549 B2* | 8/2016 | Yopp | ................... | B60S 1/023 |
| 9,445,057 B2* | 9/2016 | May | ................... | H04N 5/2171 |
| 9,467,687 B2* | 10/2016 | Takemura | ............. | G06V 20/56 |
| 9,473,718 B2* | 10/2016 | Kiyohara | .......... | G02B 13/0015 |
| 9,607,242 B2* | 3/2017 | Lavoie | ................. | B62D 13/06 |
| 9,616,851 B2* | 4/2017 | Halimeh | ............... | B60S 1/0874 |
| 9,783,166 B1 | 10/2017 | Brown | ................... | B60S 1/54 |
| 9,804,386 B2* | 10/2017 | Hayakawa | ......... | G02B 27/0006 |
| 9,972,100 B2* | 5/2018 | Lu | ................... | B60Q 1/085 |
| 10,011,226 B2* | 7/2018 | Stein | ................... | B60S 1/0844 |
| 10,045,002 B2* | 8/2018 | Nishijima | ............. | G06T 7/0002 |
| 10,089,540 B2* | 10/2018 | May | ................... | G06V 20/58 |
| 10,095,934 B2* | 10/2018 | Takemura | ............. | H04N 5/225 |
| 10,106,102 B2* | 10/2018 | Hoellt | ................... | H04N 5/247 |
| 10,196,047 B1* | 2/2019 | Hansen | ................ | B05B 12/122 |
| 10,269,331 B2* | 4/2019 | Sato | ................... | G02B 27/01 |
| 10,339,812 B2* | 7/2019 | Tamer | ................... | G06T 11/60 |
| 10,388,008 B2* | 8/2019 | Guerreiro | ........... | G06T 7/0002 |
| 10,399,106 B2* | 9/2019 | Dudar | ................... | G06V 20/56 |
| 10,421,439 B2* | 9/2019 | Hansen | ................ | B60S 1/56 |
| 10,489,934 B2* | 11/2019 | Dudar | ................... | G06Q 10/04 |
| 10,525,937 B2* | 1/2020 | Zhao | ................... | B60S 1/56 |
| 10,537,922 B2* | 1/2020 | Oba | ................... | H04N 5/22521 |
| 10,552,706 B2* | 2/2020 | Ikeda | ................... | B60R 1/00 |
| 10,564,434 B2* | 2/2020 | Sato | ................... | G06F 3/013 |
| 10,752,158 B2* | 8/2020 | Satat | ................... | B60Q 1/0023 |
| 10,829,091 B2* | 11/2020 | Herman | ................ | G06V 10/82 |
| 10,836,356 B2* | 11/2020 | Herman | ................ | B60S 1/0848 |
| 10,850,681 B2* | 12/2020 | Kubota | ................. | G06V 10/56 |
| 10,984,273 B2* | 4/2021 | Ikeda | ................... | G06T 7/0002 |
| 10,991,086 B2* | 4/2021 | Ueda | ................... | G06V 10/993 |
| 10,997,743 B2* | 5/2021 | Ikeda | ................... | G06T 7/13 |
| 11,142,124 B2* | 10/2021 | Mandai | ................. | G06T 7/001 |
| 11,170,487 B2* | 11/2021 | Ikeda | ................... | G06V 10/44 |
| 11,172,192 B2* | 11/2021 | Lu | ................... | H04N 5/2351 |
| 11,328,428 B2* | 5/2022 | Kahlbaum | ............ | G06V 20/56 |
| 11,368,672 B2* | 6/2022 | Yautz | ................... | G06K 9/6215 |
| 11,472,375 B2* | 10/2022 | Zhao | ................... | B60S 1/0848 |
| 11,479,213 B1* | 10/2022 | Kentley-Klay | ....... | G05D 1/0246 |
| 2003/0069674 A1* | 4/2003 | Stam | ................... | B60S 1/0822 701/49 |
| 2005/0254688 A1* | 11/2005 | Franz | ................... | B60S 1/0844 382/104 |
| 2006/0114318 A1* | 6/2006 | Saka | ................... | H04N 17/002 348/61 |
| 2006/0115121 A1* | 6/2006 | Saka | ................... | H04N 17/002 382/104 |
| 2006/0146178 A1* | 7/2006 | Ishiga | ................... | H04N 17/002 348/363 |
| 2006/0157639 A1* | 7/2006 | Shaffer | ............... | G06T 7/0002 250/208.1 |
| 2007/0115357 A1* | 5/2007 | Stein | ................... | B60S 1/0844 348/148 |
| 2009/0128309 A1* | 5/2009 | Hue | ................... | G06T 7/0008 340/425.5 |
| 2009/0128629 A1* | 5/2009 | Egbert | ................. | B60S 1/0844 348/148 |
| 2010/0182450 A1* | 7/2010 | Kumar | ............... | H04N 1/00037 348/E5.025 |
| 2011/0080494 A1* | 4/2011 | Mori | ................... | H04N 5/2171 348/222.1 |
| 2011/0187886 A1* | 8/2011 | Nakajima | ............ | H04N 5/2171 348/222.1 |
| 2011/0273564 A1* | 11/2011 | Seger | ................... | G06V 20/56 348/148 |
| 2012/0026318 A1* | 2/2012 | Huelsen | ................ | G06V 20/56 348/135 |
| 2012/0026330 A1* | 2/2012 | Huelsen | ................ | G01N 21/47 348/148 |
| 2012/0113258 A1* | 5/2012 | Fiess | ................... | B60R 1/00 348/148 |
| 2013/0070966 A1* | 3/2013 | Ehlgen | ................. | G06T 7/0002 382/103 |
| 2013/0092758 A1* | 4/2013 | Tanaka | ................. | B60S 1/52 239/284.1 |
| 2013/0103257 A1* | 4/2013 | Almedia | ............... | B60Q 1/303 701/36 |
| 2013/0300869 A1* | 11/2013 | Lu | ................... | H04N 7/18 348/148 |
| 2013/0308004 A1* | 11/2013 | Liu | ................... | G06T 7/13 348/E5.025 |
| 2014/0010408 A1* | 1/2014 | Irie | ................... | G06T 7/0002 382/103 |
| 2014/0132769 A1* | 5/2014 | Kido | ................... | G06V 20/58 382/104 |
| 2014/0232869 A1* | 8/2014 | May | ................... | H04N 7/18 348/148 |
| 2014/0241589 A1* | 8/2014 | Weber | ................... | G06V 20/56 382/108 |
| 2014/0270379 A1* | 9/2014 | Snider | ................. | B60R 1/00 382/104 |
| 2014/0321701 A1* | 10/2014 | Halimeh | ............... | G06V 20/56 382/103 |
| 2015/0088374 A1* | 3/2015 | Yopp | ................... | B60S 1/04 701/36 |
| 2015/0172582 A1* | 6/2015 | Kiyohara | ............ | G06V 20/56 348/322 |
| 2015/0177512 A1* | 6/2015 | Hayakawa | ......... | G02B 27/0006 348/148 |
| 2015/0202663 A1* | 7/2015 | Oba | ................... | G03B 15/00 15/94 |
| 2015/0213592 A1* | 7/2015 | Mochizuki | ............ | G06V 20/58 345/632 |
| 2015/0224917 A1* | 8/2015 | Lu | ................... | B60Q 1/1423 348/148 |
| 2015/0298657 A1* | 10/2015 | Kanter | ................. | H04N 17/002 348/148 |
| 2015/0310274 A1* | 10/2015 | Shreve | ................. | G06T 7/77 382/103 |
| 2015/0334385 A1* | 11/2015 | Takemura | ............ | H04N 17/002 348/175 |
| 2015/0356371 A1* | 12/2015 | Libal | ................... | G06V 10/431 348/311 |
| 2016/0144797 A1* | 5/2016 | Hoellt | ................... | H04N 5/2252 348/148 |
| 2016/0162740 A1* | 6/2016 | Takemura | ............ | G06V 20/56 348/148 |
| 2016/0165101 A1* | 6/2016 | Akiyama | ............. | G06T 7/0004 348/187 |
| 2016/0176384 A1* | 6/2016 | Dissette | .............. | G01S 7/02 134/34 |
| 2016/0210757 A1* | 7/2016 | Lavoie | ................. | B62D 13/06 |
| 2016/0251000 A1* | 9/2016 | Loman | ................. | B60S 1/603 137/1 |
| 2016/0297406 A1* | 10/2016 | Jansen | ................. | B60S 1/0818 |
| 2017/0036647 A1* | 2/2017 | Zhao | ................... | G02B 27/0006 |
| 2017/0076463 A1* | 3/2017 | Nishijima | ............. | G06T 7/0002 |
| 2017/0109590 A1* | 4/2017 | Gehrke | ................ | H04N 17/002 |
| 2017/0253201 A1* | 9/2017 | Maeshiro | ............. | B60R 16/037 |
| 2017/0269370 A1* | 9/2017 | Sato | ................... | G06F 3/013 |
| 2017/0270899 A1* | 9/2017 | Sato | ................... | B60R 1/00 |

(56) References Cited

U.S. PATENT DOCUMENTS

| | | | | |
|---|---|---|---|---|
| 2018/0096474 A1* | 4/2018 | Guerreiro | ............. | G06T 7/0002 |
| 2018/0114089 A1* | 4/2018 | Ikeda | ................... | G06V 10/751 |
| 2018/0143298 A1* | 5/2018 | Newman | ............ | G01C 21/3484 |
| 2018/0200745 A1* | 7/2018 | Dudar | ................... | B05B 12/004 |
| 2018/0253630 A1* | 9/2018 | Tamer | .................... | H04N 5/247 |
| 2018/0334140 A1* | 11/2018 | Ghannam | ................. | B60S 1/52 |
| 2018/0341270 A1* | 11/2018 | Dudar | ....................... | G06T 7/90 |
| 2019/0039575 A1* | 2/2019 | Hansen | .............. | G02B 27/0006 |
| 2019/0152447 A1* | 5/2019 | Hansen | .............. | G02B 27/0006 |
| 2019/0202373 A1* | 7/2019 | Kubota | .................. | G01N 21/78 |
| 2019/0241114 A1* | 8/2019 | Satat | ....................... | B60Q 1/085 |
| 2019/0322245 A1* | 10/2019 | Kline | .................... | B60S 1/0848 |
| 2020/0094784 A1* | 3/2020 | Herman | ................. | G06V 10/82 |
| 2020/0094785 A1* | 3/2020 | Herman | ................. | B60S 1/485 |
| 2020/0104991 A1* | 4/2020 | Ueda | ..................... | H04N 5/2171 |
| 2020/0210740 A1* | 7/2020 | Ikeda | .................... | G06V 10/44 |
| 2020/0211171 A1* | 7/2020 | Ikeda | ........................ | G06T 7/13 |
| 2020/0213581 A1* | 7/2020 | Lu | .............................. | G06T 7/70 |
| 2020/0219280 A1* | 7/2020 | Ikeda | ........................ | G06T 7/13 |
| 2021/0122294 A1* | 4/2021 | Mandai | .................... | G08G 1/16 |
| 2021/0192745 A1* | 6/2021 | Kahlbaum | ............ | G06V 10/50 |
| 2022/0086423 A1* | 3/2022 | Yautz | ................. | G02B 27/0006 |
| 2022/0092315 A1* | 3/2022 | Tamaoki | ................ | G06V 20/56 |

FOREIGN PATENT DOCUMENTS

| | | | | |
|---|---|---|---|---|
| CN | 103917989 A | * | 7/2014 | ............ B60S 1/0844 |
| CN | 103918006 A | * | 7/2014 | ......... G06K 9/00791 |
| CN | 102883925 B | * | 7/2016 | ............ B60S 1/0844 |
| CN | 112329623 A | * | 2/2021 | |
| DE | 102019125166 A1 | * | 3/2020 | ............ B60S 1/0848 |
| DE | 102019125303 A1 | * | 3/2020 | ............ B60S 1/0848 |
| DE | 102021005387 A1 | * | 12/2021 | |
| JP | 2017058949 A | | 3/2017 | |

* cited by examiner

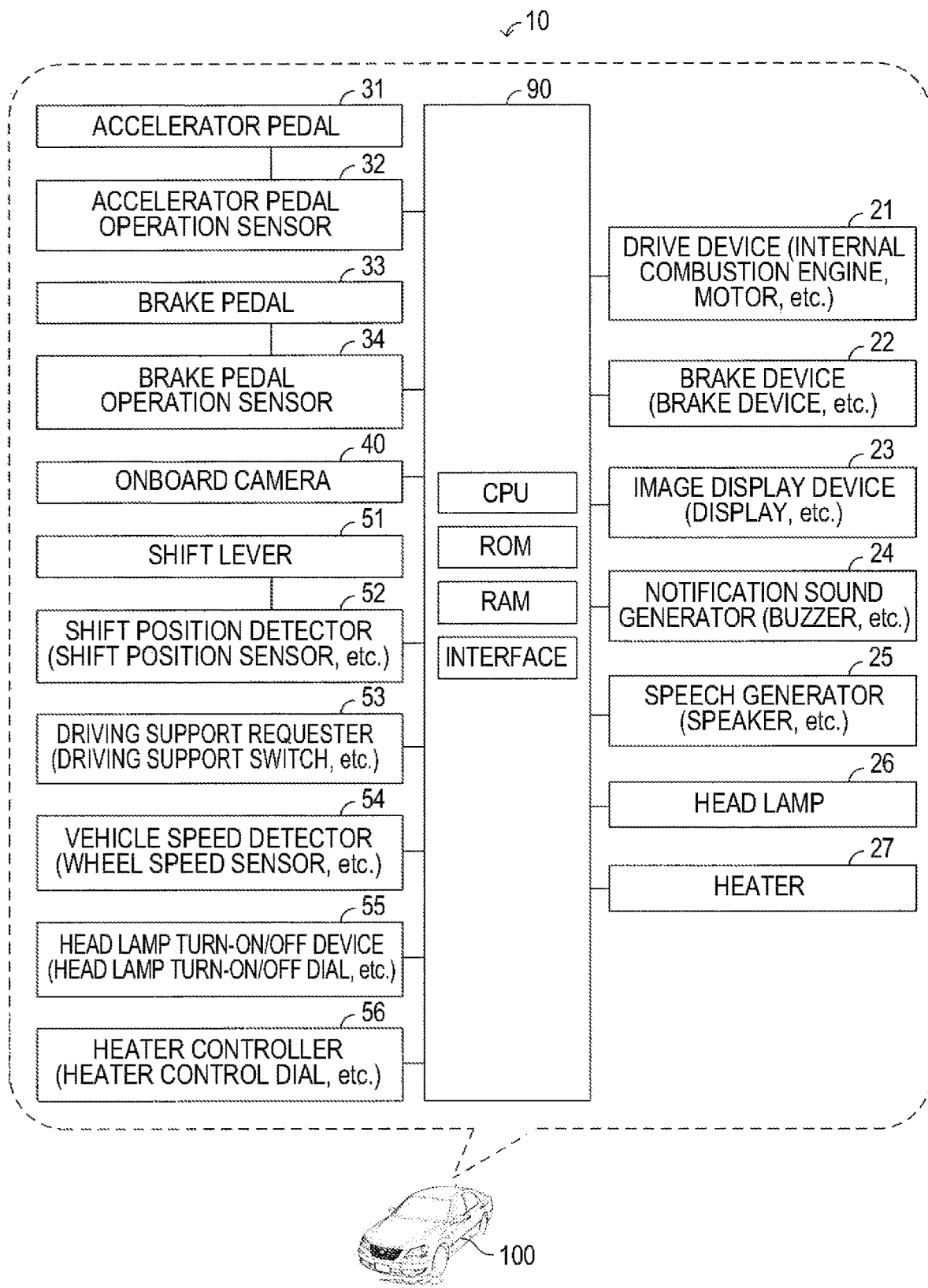

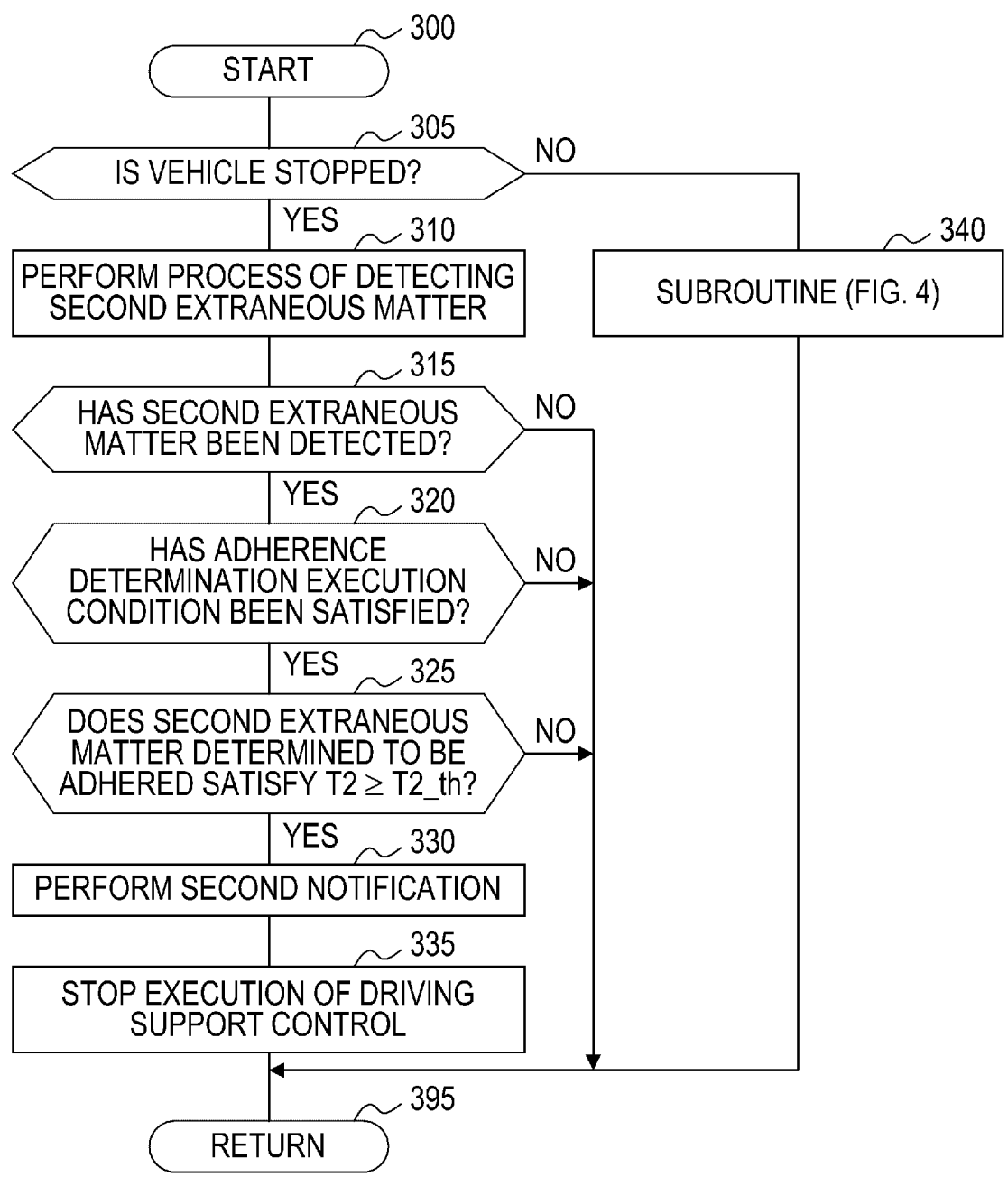

VEHICLE DRIVING SUPPORT DEVICE

CROSS-REFERENCE TO RELATED APPLICATION

This application claims priority to Japanese Patent Application No. 2020-158378 filed on Sep. 23, 2020, incorporated herein by reference in its entirety.

BACKGROUND

1. Technical Field

The disclosure relates to a vehicle driving support device.

2. Description of Related Art

A vehicle driving support device that performs driving support control for supporting a vehicle driving operation which is performed by a driver of the vehicle using an image captured by an onboard camera is known. When the onboard camera is mounted in the vehicle such that an outside view from the vehicle is imaged from the inside of the vehicle through a window and extraneous matter such as dirt or water droplets is adhered to the window in a viewing angle range of the onboard camera, an image captured by the onboard camera becomes blurred and thus there is a likelihood that the driver will not be able to be provided with appropriate driving operation support through the driving support control. Accordingly, in order to provide the driver with appropriate driving operation support through the driving support control, it is necessary to detect extraneous matter adhering to the window in the viewing angle range of the onboard camera. For example, a technique of detecting such extraneous matter is described in Japanese Unexamined Patent Application Publication No. 2017-58949 (JP 2017-58949 A).

SUMMARY

In JP 2017-58949 A, detection of extraneous matter when a vehicle is stopped is not particularly mentioned. An outside view from the vehicle which is imaged by an onboard camera when the vehicle is stopped may be greatly different from a view when the vehicle is traveling.

For example, when the vehicle is stopped with a wall positioned in front thereof or the vehicle is stopped to allow a large truck to pass in front of the vehicle, the luminance of an image as a whole from the onboard camera decreases greatly and thus there is a likelihood that extraneous matter will be determined to be adhered to a part of a window in the viewing angle range of the onboard camera or a lens of the onboard camera.

The disclosure was made to cope with the aforementioned problems. That is, the disclosure provides a vehicle driving support device that can accurately determine whether extraneous matter is adhered to a part of a window in a viewing angle range of an onboard camera or a lens of the onboard camera when a vehicle is stopped.

According to the disclosure, there is provided a vehicle driving support device including a control unit configured to perform extraneous matter notification for notifying an occupant of a vehicle that extraneous matter is adhered to a viewing-angle window part which is a part of a window of the vehicle in a viewing angle range of an onboard camera which is mounted in the vehicle such that an outside view from the vehicle is imaged from the inside of the vehicle or a camera lens which is a lens of the onboard camera.

The control unit is configured to perform a process of detecting the extraneous matter adhering to the viewing-angle window part or the camera lens when the vehicle is stopped. The control unit is configured not to perform the extraneous matter notification even if extraneous matter adhering to the viewing-angle window part or the camera lens is detected when the vehicle is stopped and is not in a state in which the vehicle is predicted to be about to start traveling.

With this configuration, when the stopped vehicle is not going to start travel and an advantage of notification of extraneous matter at that time is insufficient, the extraneous matter notification is not performed. As a result, it is possible to accurately determine whether extraneous matter is adhered to the viewing-angle window part or the camera lens when the vehicle is stopped.

In the vehicle driving support device according to the disclosure, for example, the extraneous matter may include first extraneous matter which is assumed to be removed when the vehicle is traveling and second extraneous matter which is assumed not to be removed when the vehicle is traveling. In this case, the control unit may be configured not to perform the extraneous matter notification when the vehicle is stopped and the first extraneous matter is adhered to the viewing-angle window part or the camera lens.

With this configuration, the extraneous matter notification for the first extraneous matter which is assumed to be removed when the vehicle is traveling, that is, the first extraneous matter which is assumed to be removed when the vehicle starts traveling, is not performed when the vehicle is stopped. Accordingly, it is possible to avoid execution of the extraneous matter notification for which a necessity is insufficient.

The control unit may be configured to perform a process of detecting the extraneous matter adhering to the viewing-angle window part or the camera lens when the vehicle is traveling. The control unit may be configured to perform the extraneous matter notification when the vehicle is traveling and predetermined conditions including at least a condition that the extraneous matter has been detected are satisfied.

With this configuration, when extraneous matter is adhered to the viewing-angle window part or the camera lens while the vehicle is traveling, the extraneous matter notification is performed and thus it is possible to notify an occupant of the vehicle that extraneous matter is adhered to the viewing-angle window part or the camera lens.

The control unit may be configured to perform a process of detecting the second extraneous matter adhering to the viewing-angle window part or the camera lens when the vehicle is stopped. The control unit may be configured not to perform the extraneous matter notification even if the second extraneous matter adhering to the viewing-angle window part or the camera lens is detected when the vehicle is stopped and is not in a state in which the vehicle is predicted to be about to start traveling.

With this configuration, when the stopped vehicle is not going to start travel and an advantage of notification of second extraneous matter at that time is insufficient, the extraneous matter notification is not performed. As a result, it is possible to accurately determine whether extraneous matter is adhered to the viewing-angle window part or the camera lens when the vehicle is stopped.

The control unit may be configured not to perform a process of detecting the first extraneous matter adhering to the viewing-angle window part or the camera lens when the vehicle is stopped.

With this configuration, the extraneous matter notification for the first extraneous matter which is assumed to be removed while the vehicle is traveling, that is, the first extraneous matter which is assumed to be removed when the vehicle starts traveling, is not performed when the vehicle is stopped. Accordingly, it is possible to avoid execution of the extraneous matter notification for which a necessity is insufficient.

The control unit may be configured not to perform a process of detecting the first extraneous matter adhering to the viewing-angle window part or the camera lens and to perform a process of detecting the second extraneous matter adhering to the viewing-angle window part or the camera lens when the vehicle is stopped. The control unit may be configured not to determine whether conditions for performing the extraneous matter notification are satisfied even if the second extraneous matter adhering to the viewing-angle window part or the camera lens is detected when the vehicle is stopped and is not in a state in which the vehicle is predicted to be about to start traveling.

With this configuration, when the stopped vehicle is not going to start travel and an advantage of notification of the second extraneous matter at that time is insufficient, the extraneous matter notification is not performed. As a result, it is possible to accurately determine whether extraneous matter is adhered to the viewing-angle window part or the camera lens when the vehicle is stopped.

The control unit may be configured to perform the process of detecting the first extraneous matter adhering to the viewing-angle window part or the camera lens and to perform the process of detecting the second extraneous matter adhering to the viewing-angle window part or the camera lens when the vehicle is traveling. The control unit may be configured to perform the extraneous matter notification when the vehicle is traveling and predetermined conditions including at least a condition that the first extraneous matter or the second extraneous matter has been detected is satisfied.

With this configuration, when the first extraneous matter or the second extraneous matter is adhered to the viewing-angle window part or the camera lens while the vehicle is traveling, the extraneous matter notification is performed and thus it is possible to notify an occupant of the vehicle that the first extraneous matter or the second extraneous matter is adhered to the viewing-angle window part or the camera lens.

The control unit may be configured to perform driving support control for supporting a driver's driving operation of the vehicle based on an image captured by the onboard camera. The control unit may be configured to stop the driving support control at the time of performing the extraneous matter notification when the driving support control is being performed and the extraneous matter notification is performed.

With this configuration, when extraneous matter is adhered to the viewing-angle window part or the camera lens and there is a likelihood that the driving support control based on an image captured by the onboard camera will not be able to be appropriately performed, the driving support control is stopped. Accordingly, it is possible to avoid execution of inappropriate driving support control.

Elements of the disclosure are not limited to an embodiment of the disclosure which will be described later with reference to the accompanying drawings. Other objectives, other features, and accompanying advantages of the disclosure will be easily understood from the following description of the embodiment of the disclosure.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a diagram illustrating a vehicle driving support device according to an embodiment of the disclosure and a vehicle to which the vehicle driving support device is applied;

FIG. 3 is a flowchart illustrating a routine which is performed by the vehicle driving support device according to the embodiment of the disclosure.

DETAILED DESCRIPTION OF EMBODIMENTS

Figure 2A:
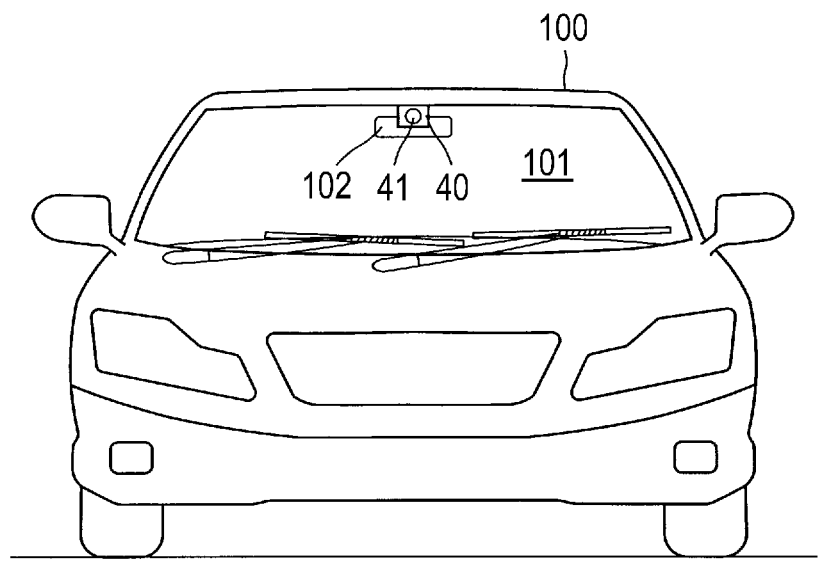
FIG. 2A is a diagram illustrating the vehicle to which the vehicle driving support device according to the embodiment of the disclosure is applied.

Hereinafter, a vehicle driving support device according to an embodiment of the disclosure will be described with reference to the accompanying drawings. FIG. 1 illustrates a vehicle driving support device 10 according to an embodiment of the disclosure. The vehicle driving support device 10 is mounted in a host vehicle 100.

ECU

The vehicle driving support device 10 includes an ECU 90. ECU is an abbreviation of electronic control unit. The ECU 90 includes a microcomputer as a main component. The microcomputer includes a CPU, a ROM, a RAM, a nonvolatile memory, and an interface. The CPU realizes various functions by executing instructions, programs, or routines which are stored in the ROM.

Drive Device, Etc.

A drive device 21, a brake device 22, an image display device 23, a notification sound generator 24, a speech generator 25, a head lamp 26, and a heater 27 are mounted in the host vehicle 100.

Drive Device

The drive device 21 is a device that applies a driving force for allowing the host vehicle 100 to travel to the host vehicle 100 and includes, for example, an internal combustion engine and a motor. The drive device 21 is electrically connected to the ECU 90. The ECU 90 can control the driving force which is applied to the host vehicle 100 by controlling the operation of the drive device 21.

Brake Device

The brake device 22 is a device that applies a braking force for braking the host vehicle 100 to the host vehicle 100 and is, for example, a brake. The brake device 22 is electrically connected to the ECU 90. The ECU 90 can control the braking force which is applied to the host vehicle 100 by controlling the operation of the brake device 22.

Image Display Device

The image display device 23 is, for example, a display. The image display device 23 is electrically connected to the ECU 90. The ECU 90 can cause the image display device 23 to display various images.

Notification Sound Generator

The notification sound generator 24 is, for example, a buzzer. The notification sound generator 24 is electrically connected to the ECU 90. The ECU 90 can generate various types of notification sound from the notification sound generator 24.

Speech Generator

The speech generator 25 is, for example, a speaker. The speech generator 25 is electrically connected to the ECU 90. The ECU 90 can generate various types of speech from the speech generator 25.

Head Lamp

The head lamp 26 is provided in the host vehicle 100 such that a view in front of the host vehicle 100 can be lighted. The head lamp 26 is electrically connected to the ECU 90. The ECU 90 can turn on or turn off the head lamp 26.

Heater

The heater 27 is provided in the host vehicle 100 such that the inside of the host vehicle 100 can be heated. The heater 27 is electrically connected to the ECU 90. The ECU 90 can activate the heater 27 to heat the inside of the host vehicle 100 or stop the heater 27.

Onboard Camera, Etc.

An accelerator pedal 31, an accelerator pedal operation sensor 32, a brake pedal 33, a brake pedal operation sensor 34, an onboard camera 40, a shift lever 51, a shift position detector 52, a driving support requester 53, a vehicle speed detector 54, a head lamp turn-on/off device 55, and a heater controller 56 are mounted in the host vehicle 100.

Accelerator Pedal Operation Sensor

The accelerator pedal operation sensor 32 is electrically connected to the ECU 90. The accelerator pedal operation sensor 32 detects an amount of operation of the accelerator pedal 31 and transmits information on the detected amount of operation to the ECU 90. The ECU 90 acquires the amount of operation of the accelerator pedal 31 as an accelerator pedal operation amount AP based on the information. The ECU 90 controls the operation of the drive device 21 based on the accelerator pedal operation amount AP.

Brake Pedal Operation Sensor

The brake pedal operation sensor 34 is electrically connected to the ECU 90. The brake pedal operation sensor 34 detects an amount of operation of the brake pedal 33 and transmits information on the detected amount of operation to the ECU 90. The ECU 90 acquires the amount of operation of the brake pedal 33 as a brake pedal operation amount BP based on the information. The ECU 90 controls the operation of the brake device 22 based on the brake pedal operation amount BP. When the brake pedal operation amount BP is greater than zero, the ECU 90 can recognize that the brake pedal 33 has been operated.

Onboard Camera

Figure 2B:
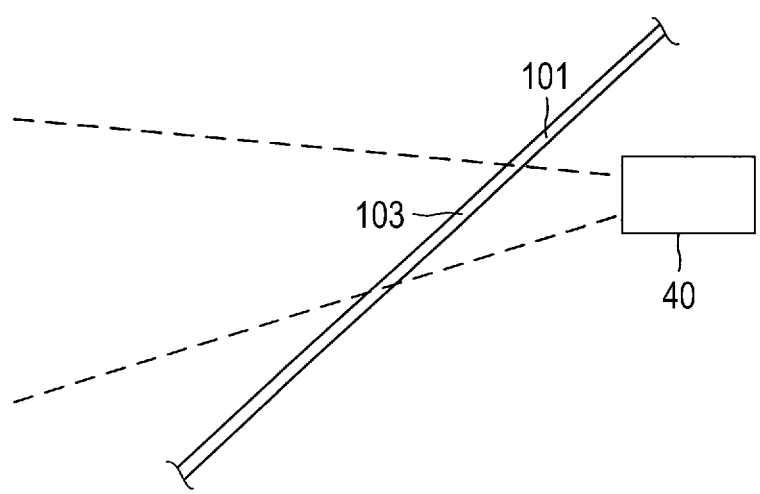
FIG. 2B is a diagram illustrating an onboard camera mounted in the vehicle to which the vehicle driving support device according to the embodiment of the disclosure is applied.

The onboard camera 40 is a device that images the surroundings of the host vehicle 100. The onboard camera 40 is electrically connected to the ECU 90. As illustrated in FIGS. 2A and 2B, in this example, the onboard camera 40 is provided in the cabin of the host vehicle 100, particularly, between a rear-view mirror 102 of the host vehicle 100 and a front windshield 101 of the host vehicle 100, such that a view in front of the host vehicle 100 can be imaged through the front windshield 101 of the host vehicle 100. The onboard camera 40 acquires an image of the view in front of the host vehicle 100 by imaging the front view of the host vehicle 100, and transmits information on the acquired image to the ECU 90. The ECU 90 can ascertain a front situation of the host vehicle 100 based on the information. In the following description, information on an image acquired by the onboard camera 40 is referred to as "image information Iimg."

The onboard camera 40 may image a view to the rear of the host vehicle 100 through a rear windshield of the host vehicle 100, may image a view to the left of the host vehicle 100 through a left windshield of the host vehicle 100, or may image a view to the right of the host vehicle 100 through a right windshield of the host vehicle 100.

Shift Position Detector

The shift position detector 52 is a device that detects a position of the shift lever 51 of the host vehicle 100 and is, for example, a shift position sensor. In this example, a driver of the host vehicle 100 can operate the shift lever 51 to one of a D range, an R range, an N range, and a P range.

The D range is a position (a drive range, a forward movement range, or a forward movement position) at which a driving force causing the host vehicle 100 to move forward is applied to driving wheels of the host vehicle 100. Accordingly, when which the shift lever 51 is moved to the D range and a driving force is applied to the driving wheels in a state in, the host vehicle 100 moves forward.

The R range is a position (a rear range, a reverse range, or a reverse position) at which a driving force for causing the host vehicle 100 to move rearward is applied to the driving wheels of the host vehicle 100. Accordingly, when the shift lever 51 is moved to the R range and a driving force is applied to the driving wheels, the host vehicle 100 moves rearward.

The N range is a position (a neutral range or a neutral position) at which a driving force is not applied to the driving wheels of the host vehicle 100. Accordingly, when the shift lever 51 is operated to the N range, a driving force is not applied to the driving wheels and the host vehicle 100 does not move forward nor move rearward.

The P range is a position (a park range or a park position) at which the host vehicle 100 is kept stopped. Accordingly, when the shift lever 51 is operated to the P range, the host vehicle 100 is maintained in a stopped state.

The shift position detector 52 is electrically connected to the ECU 90. The shift position detector 52 transmits information on the range to which the shift lever 51 is set to the ECU 90. The ECU 90 can ascertain the range to which the shift lever 51 is set based on the information.

Driving Support Requester

The driving support requester 53 is a device that is operated by a driver for the purpose of requesting execution of driving support control or requesting stopping of the driving support control and is, for example, a switch type or button type device. The driving support requester 53 is electrically connected to the ECU 90. When a predetermined operation of requesting execution of driving support control is performed on the driving support requester 53 by a driver, the driving support requester 53 transmits a predetermined execution request signal to the ECU 90. On the other hand, when a predetermined operation of requesting stopping of the driving support control is performed on the driving support requester 53 by a driver, the driving support requester 53 transmits a predetermined stop request signal to the ECU 90. When the execution request signal is received, the ECU 90 starts the driving support control. On the other hand, when the stop request signal is received, the ECU 90 stops the driving support control.

Driving Support Control

In this example, the driving support control is control for supporting a driver's driving operation of the host vehicle 100 and is, for example, inter-vehicle distance keep control (so-called cruise control). The inter-vehicle distance keep control is control for controlling the operations of the drive device 21 and the brake device 22 and controlling the driving force and the braking force applied to the host vehicle 100 such that a distance (an inter-vehicle distance) between another vehicle (a preceding vehicle) traveling in front of the host vehicle 100 and the host vehicle 100 is kept a predetermined distance even when a driver of the host vehicle 100 is not operating the accelerator pedal 31 or the brake pedal 33.

When execution of inter-vehicle distance keep control is requested, the ECU 90 acquires a distance (an inter-vehicle distance) between a preceding vehicle and the host vehicle 100 using the image information Iimg, applies a braking force to the host vehicle 100 to decelerate the host vehicle 100 when the inter-vehicle distance is less than a predetermined distance, and applies a driving force to the host vehicle 100 or increases the driving force to accelerate the host vehicle 100 when the inter-vehicle distance is greater than a predetermined distance.

Vehicle Speed Detector

The vehicle speed detector 54 is a device that detects a traveling speed of the host vehicle 100 and is, for example, a wheel speed sensor. The vehicle speed detector 54 is electrically connected to the ECU 90. The vehicle speed detector 54 detects a traveling speed of the host vehicle 100 and transmits information on the traveling speed to the ECU 90. The ECU 90 acquires the traveling speed of the host vehicle 100 as a vehicle speed SPD based on the information. The ECU 90 determines that the host vehicle 100 is traveling when the vehicle speed SPD is greater than zero, and determines that the host vehicle 100 is stopped when the vehicle speed SPD is zero.

Head Lamp Turn-On/Off Device

The head lamp turn-on/off device 55 is a device that is operated by a driver for the purpose of turning on or off the head lamp 26 and is, for example, a dial type device (a head lamp turn-on/off dial) which is provided at a tip of a direction indicator lever of the host vehicle 100. The head lamp turn-on/off device 55 is set to at least one of an on position and an off position. When the head lamp turn-on/off device 55 is set to the on position, the head lamp turn-on/off device 55 transmits a predetermined on signal to the ECU 90. On the other hand, when the head lamp turn-on/off device 55 is set to the off position, the head lamp turn-on/off device 55 transmits a predetermined off signal to the ECU 90. When the on signal is received, the ECU 90 turns on the head lamp 26. On the other hand, when the off signal is received, the ECU 90 turns off the head lamp 26.

Heater Controller

The heater controller 56 is a device that is operated by a driver for the purpose of activating or stopping the heater 27 and is, for example, a dial type device (a heater control dial). The heater controller 56 is set to at least one of an on position and an off position. When the heater controller 56 is set to the on position, the heater controller 56 transmits a predetermined on signal to the ECU 90. On the other hand, when the heater controller 56 is set to the off position, the heater controller 56 transmits a predetermined off signal to the ECU 90. When the on signal is received, the ECU 90 activates the heater 27. On the other hand, when the off signal is received, the ECU 90 stops the heater 27.

Summary of Operation of Vehicle Driving Support Device

The operation of the vehicle driving support device 10 will be described below.

When extraneous matter such as fogginess (first extraneous matter) is adhered to a part of a front windshield 101 in a viewing angle range of the onboard camera 40 (a viewing-angle window part 103) or a lens of the onboard camera 40 (a camera lens 41), a blurred portion appears in an image captured by the onboard camera 40. Accordingly, the ECU 90 cannot accurately recognize a front view of the host vehicle 100 based on the image information Iimg transmitted from the onboard camera 40 at that time.

When extraneous matter such as dirt (second extraneous matter) is adhered to the viewing-angle window part 103 or the camera lens 41, the second extraneous matter appears in a part of an image captured by the onboard camera 40. Accordingly, the ECU 90 cannot accurately recognize a front view of the host vehicle 100 based on the image information Iimg transmitted from the onboard camera 40 at that time.

In this way, when the ECU 90 cannot accurately recognize the front view of the host vehicle 100 (that is, when an imaging failure occurs), there is a likelihood that the ECU 90 will not be able to appropriately perform driving support control which will be described later based on the image information Iimg. Accordingly, when an imaging failure occurs, it is preferable to stop the driving support control and to notify a driver (or an occupant) of the host vehicle 100 that the driving support control is stopped due to the imaging failure.

The front view of the host vehicle 100 changes greatly between while the host vehicle 100 is traveling and while the host vehicle 100 is stopped.

For example, the host vehicle 100 may be stopped with a wall positioned in front thereof or the host vehicle 100 may be stopped to allow a large truck to pass in front of the host vehicle 100. In this case, the onboard camera 40 images the wall or the large truck and there is a likelihood that the ECU 90 will determine that the wall or the large truck is dirt (second extraneous matter) adhering to the viewing-angle window part 103 or the camera lens 41 based on the image information Iimg. In this case, it is not preferable to stop the driving support control or to notify a driver (or an occupant) of the host vehicle 100 that the driving support control is stopped.

When it is foggy and the host vehicle 100 is stopped, there is also a likelihood that the ECU 90 will determine that the fog is fogginess (first extraneous matter) generated on the viewing-angle window part 103 or the camera lens 41. In this case, it is also not preferable to stop the driving support control or to notify a driver (or an occupant) of the host vehicle 100 that the driving support control is stopped.

When fogginess is generated on the viewing-angle window part 103 or the camera lens 41 while the host vehicle 100 is stopped, there is a high likelihood that fogginess will be generated in a part of the front windshield 101 other than the viewing-angle window part 103 at that time. In this case, since a driver activates the heater 27 to remove the fogginess at the time of starting travel of the host vehicle 100, there is a high likelihood that the fogginess generated on the viewing-angle window part 103 or the camera lens 41 will be removed. That is, when travel of the host vehicle 100 is started, an imaging failure due to the fogginess is likely to be removed. Accordingly, in this case, it is also not preferable to stop the driving support control or to notify a driver (or an occupant) of the host vehicle 100 that the driving support control is stopped.

When the host vehicle 100 is stopped to pass a large truck through the front of the host vehicle 100 and then the host vehicle 100 starts traveling, the large truck is not present in front of the host vehicle 100 and thus it is not determined that dirt (second extraneous matter) is adhered to the viewing-angle window part 103 or the camera lens 41. Accordingly, when the host vehicle 100 is stopped and second extraneous matter is adhered to the viewing-angle window part 103 or the camera lens 41, it is also not preferable to immediately stop the driving support control or to immediately notify a driver (or an occupant) of the host vehicle 100 that the driving support control is stopped.

In order to avoid non-preferable stopping of the driving support control or non-preferable notification of a driver (or an occupant) of the host vehicle 100, the vehicle driving support device 10 (particularly the ECU 90) performs a process of detecting first extraneous matter, a process of determining adherence of first extraneous matter such as fogginess, a process of detecting second extraneous matter such as dirt, and a process of determining adherence of second extraneous matter as follows.

In this example, first extraneous matter is extraneous matter which is adhered to the viewing-angle window part 103 or the camera lens 41 and is extraneous matter which is assumed to be removed while the host vehicle 100 is traveling. The second extraneous matter is extraneous matter which is adhered to the viewing-angle window part 103 or the camera lens 41 and extraneous matter which is assumed not to be removed while the host vehicle 100 is traveling.

Process of Detecting Extraneous Matter and Determination of Adherence while Traveling When the host vehicle 100 is traveling, the vehicle driving support device 10 performs a process of detecting first extraneous matter adhering to the viewing-angle window part 103 or the camera lens 41 (a first extraneous matter detecting process) based on the image information Iimg and performs a process of detecting second extraneous matter adhering to the viewing-angle window part 103 or the camera lens 41 (a second extraneous matter detecting process) based on the image information Iimg.

When first extraneous matter has been detected through the process of detecting first extraneous matter, the vehicle driving support device 10 determines whether a condition that first extraneous matter continues to be detected for a predetermined first time T1_th (a first extraneous matter detection condition) has been satisfied (determination of adherence of first extraneous matter).

When it is determined that the first extraneous matter detection condition has been satisfied through the determination of adherence of first extraneous matter, the vehicle driving support device 10 determines that an imaging failure due to the first extraneous matter occurs, stops the driving support control, and performs first notification of notifying a driver (or an occupant) of the host vehicle 100 that the driving support control is stopped due to the imaging failure based on the first extraneous matter adhering to the viewing-angle window part 103 or the camera lens 41.

That is, when predetermined conditions including the condition that first extraneous matter has been detected while the host vehicle 100 is traveling and the first extraneous matter detection condition are satisfied, the vehicle driving support device 10 performs stopping of driving support control and the first notification. In this case, the vehicle driving support device 10 may be configured to perform only the first notification without stopping the driving support control.

In this example, the first notification is notification which is realized by performing at least one of display of a notification image on the image display device 23, generation of notification sound from the notification sound generator 24, and generation of notification speech (announcement) from the speech generator 25.

When it is determined in the determination of adherence of first extraneous matter that the first extraneous matter detection condition has not been satisfied, the vehicle driving support device 10 does not determine that an imaging failure based on first extraneous matter has occurred and thus does not stop the driving support control and does not perform the first notification.

Similarly, when second extraneous matter has been detected through the process of detecting second extraneous matter, the vehicle driving support device 10 determines whether a condition that second extraneous matter continues to be detected for a second predetermined time T2_th (a second extraneous matter detection condition) has been satisfied (determination of adherence of second extraneous matter). The predetermined second time T2_th may be a time having the same length as the predetermined first time T1_th or may be a time having a length different from that of the predetermined first time T1_th.

When it is determined in the determination of adherence of second extraneous matter that the second extraneous matter detection condition has been satisfied, the vehicle driving support device 10 determines that an imaging failure based on second extraneous matter has occurred, stops the driving support control, and performs second notification of notifying a driver (or an occupant) of the host vehicle 100 that the driving support control is stopped due to the imaging failure based on second extraneous matter adhering to the viewing-angle window part 103 or the camera lens 41.

That is, when predetermined conditions including the condition that second extraneous matter has been detected while the host vehicle 100 is traveling and the second extraneous matter detection condition are satisfied, the vehicle driving support device 10 performs stopping of driving support control and the second notification. In this case, the vehicle driving support device 10 may be configured to perform only the second notification without stopping the driving support control.

In this example, the second notification is notification which is realized by performing at least one of display of a notification image on the image display device 23, generation of notification sound from the notification sound generator 24, and generation of notification speech (announcement) from the speech generator 25.

When it is determined in the determination of adherence of second extraneous matter that the second extraneous matter detection condition has not been satisfied, the vehicle driving support device 10 does not determine that an imaging failure based on second extraneous matter has occurred and thus does not stop the driving support control and does not perform the second notification.

Process of Detecting Extraneous Matter and Determination of Adherence while being Stopped On the other hand, when the host vehicle 100 is stopped, the vehicle driving support device 10 does not perform the process of detecting first extraneous matter but performs only the process of detecting second extraneous matter.

Accordingly, while the host vehicle 100 is stopped, first extraneous matter is not detected by the vehicle driving support device 10, and thus it is not determined that an imaging failure based on first extraneous matter has occurred and stopping of driving support control and first notification are not performed by the vehicle driving support device 10.

When second extraneous matter is detected through the process of detecting second extraneous matter, the vehicle driving support device 10 determines whether an adherence determination execution condition that the host vehicle 100 is predicted to be about to start traveling is satisfied. The adherence determination execution condition is a condition that determination of adherence of second extraneous matter is performed.

When the shift lever 51 is not operated to the D range or the R range, the host vehicle 100 is not likely to immediately start travel. Accordingly, when the shift lever 51 is operated to the D range or the R range, the vehicle driving support device 10 determines that the host vehicle 100 is not predicted to be about to start travel.

When the shift lever 51 is operated to the D range or the R range and the brake pedal 33 is depressed, the host vehicle 100 is not likely to immediately start travel. Accordingly, when the shift lever 51 is operated to the D range or the R range and the brake pedal 33 is depressed, the vehicle driving support device 10 determines that the host vehicle 100 is not predicted to be about to start travel.

When the head lamp 26 is in the off state (particularly, when the head lamp 26 is in the off state in the nighttime), the host vehicle 100 is not likely to immediately start travel. Accordingly, when the head lamp 26 is in the off state, the vehicle driving support device 10 determines that the host vehicle 100 is not predicted to be about to start travel.

When the driving support control is not being performed, an advantage of determination of adherence of second extraneous matter is insufficient. Therefore, the adherence determination execution condition may include a condition that the driving support control is being performed. In this case, the vehicle driving support device 10 determines that the adherence determination execution condition has not been satisfied when the driving support control is stopped.

When the adherence determination execution condition has not been satisfied, the vehicle driving support device 10 does not perform determination of adherence of second extraneous matter. Accordingly, the vehicle driving support device 10 does not determine that an imaging failure based on second extraneous matter has occurred and does not perform the second notification.

On the other hand, when the adherence determination execution condition has been satisfied, the vehicle driving support device 10 performs determination of adherence of second extraneous matter.

When it is determined in the determination of adherence of second extraneous matter that the second extraneous matter detection condition has been satisfied, the vehicle driving support device 10 determines that an imaging failure based on second extraneous matter has occurred and thus performs stopping of the driving support control and the second notification.

When it is determined in the determination of adherence of second extraneous matter that the second extraneous matter detection condition has been satisfied, the vehicle driving support device 10 determines that an imaging failure based on second extraneous matter has not occurred, and thus does not perform stopping of the driving support control and the second notification.

Advantageous Effects

With this configuration, when second extraneous matter has been detected while the host vehicle 100 is stopped, the determination of adherence of second extraneous matter is performed only when the host vehicle 100 is predicted to be about to start travel. In other words, when the host vehicle 100 is not predicted to be about to start travel, that is, when the host vehicle 100 is not likely to immediately start travel and an advantage of determination of adherence of second extraneous matter is insufficient at that time, the determination of adherence of second extraneous matter is not performed. Accordingly, it is possible to avoid non-preferable stopping of driving support control or non-preferable execution of second notification. When the host vehicle 100 is predicted to be about to start travel, that is, when the host vehicle 100 is likely to immediately start travel and there is a sufficient profit on the determination of adherence of second extraneous matter at that time, the determination of adherence of second extraneous matter is performed and thus it is possible to perform appropriate stopping of driving support control or appropriate execution of second notification.

When the host vehicle 100 is stopped, a process of detecting first extraneous matter (a first extraneous matter detecting process) which is highly likely to be removed when travel of the host vehicle 100 is started is not performed. Accordingly, it is possible to avoid unnecessary stopping of driving support control or unnecessary execution of second notification.

Specific Operation

A specific operation of the vehicle driving support device 10 will be described below. The CPU of the ECU 90 of the vehicle driving support device 10 performs a routine illustrated in FIG. 3 at intervals of a predetermined time.

Accordingly, when a predetermined timing arrives, the CPU starts the routine from Step 300 in FIG. 3, causes the routine to proceed to Step 305, and determines whether the host vehicle 100 is stopped.

When the determination result of Step 305 is "YES," the CPU causes the routine to proceed to Step 310 and performs a second extraneous matter detecting process. Subsequently, the CPU causes the routine to proceed to Step 315 and determines whether second extraneous matter has been detected in the second extraneous matter detecting process.

When the determination result of Step 315 is "YES," the CPU causes the routine to proceed to Step 320 and determines whether a adherence determination execution condition has been satisfied.

When the determination result of Step 320 is "YES," the CPU causes the routine to proceed to Step 325 and performs determination of adherence of second extraneous matter. That is, the CPU determines whether a second extraneous matter detection condition that a time T2 in which second extraneous matter continues to be detected is equal to or greater than the predetermined second time T2_th has been satisfied.

When the determination result of Step 325 is "YES," the CPU causes the routine to proceed to Step 330 and performs second notification. Subsequently, the CPU causes the routine to proceed to Step 335 and stops the driving support control. Thereafter, the CPU causes the routine to proceed to Step 395 and temporarily ends this routine.

On the other hand, when the determination result of Step 315, Step 320, or Step 325 is "NO," the CPU causes the routine to proceed directly to Step 395 and temporarily ends this routine.

Figure 4:
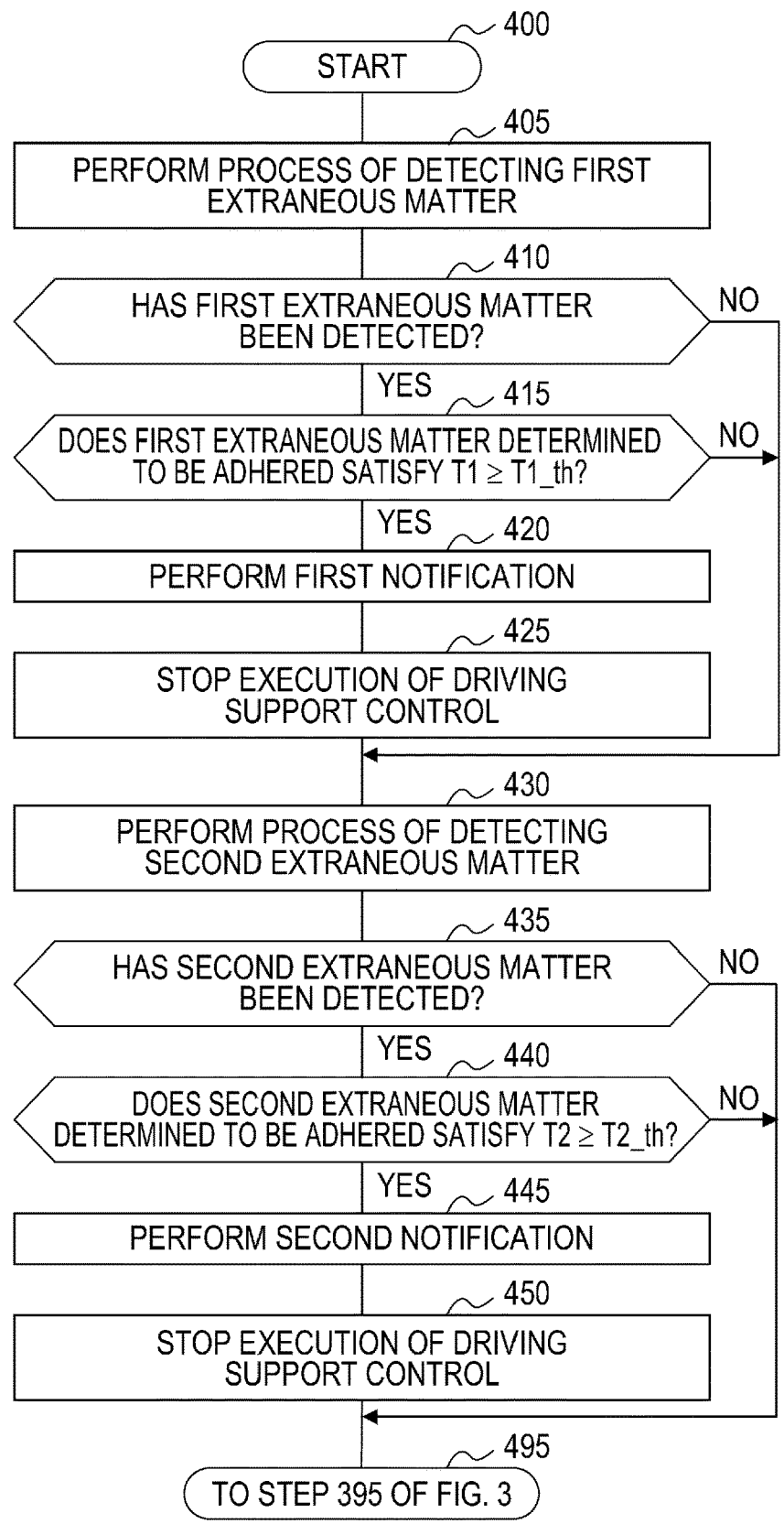
FIG. 4 is a flowchart illustrating a routine which is performed by the vehicle driving support device according to the embodiment of the disclosure.

When the determination result of Step 305 is "NO," the CPU causes the routine to proceed to Step 340 and performs a subroutine illustrated in FIG. 4. Accordingly, when the routine proceeds to Step 340, the CPU starts the subroutine from Step 400 in FIG. 4, causes the routine to proceed to Step 405, and performs a first extraneous matter detecting process. Subsequently, the CPU causes the routine to proceed to Step 410 and determines whether first extraneous matter has been detected in the first extraneous matter detecting process.

When the determination result of Step 410 is "YES," the CPU causes the routine to proceed to Step 415 and performs determination of adherence of first extraneous matter. That is, the CPU determines whether a first extraneous matter detection condition that the time T1 in which first extraneous matter continues to be detected is equal to or greater than the predetermined first time T1_th has been satisfied.

When the determination result of Step 415 is "YES," the CPU causes the routine to proceed to Step 420 and performs first notification. Subsequently, the CPU causes the routine to proceed to Step 425 and stops the driving support control. Thereafter, the CPU causes the routine to proceed to Step 430.

On the other hand, when the determination result of Step 410 or Step 415 is "NO," the CPU causes the routine to proceed directly to Step 430.

When the routine proceeds to Step 430, the CPU performs the second extraneous matter detecting process. Subsequently, the CPU causes the routine to proceed to Step 435 and determines whether second extraneous matter has been detected in the second extraneous matter detecting process.

When the determination result of Step 435 is "YES," the CPU causes the routine to proceed to Step 440 and performs the determination of adherence of second extraneous matter. That is, the CPU determines whether the second extraneous matter detection condition that the time T2 in which second extraneous matter continues to be detected is equal to or greater than the predetermined second time T2_th has been satisfied.

When the determination result of Step 440 is "YES," the CPU causes the routine to proceed to Step 445 and performs the second notification. Subsequently, the CPU causes the routine to proceed to Step 450 and stops the driving support control. Thereafter, the CPU causes the routine to proceed to Step 395 in FIG. 3 via Step 495 and temporarily ends this routine.

On the other hand, when the determination result of Step 435 or Step 440 is "NO," the CPU causes the routine to proceed to Step 395 in FIG. 3 via Step 495 and temporarily ends this routine.

A specific operation of the vehicle driving support device 10 has been described hitherto.

The disclosure is not limited to the aforementioned embodiment and can employ various modification.

What is claimed is:

1. A vehicle driving support device comprising a control unit configured to perform extraneous matter notification for notifying an occupant of a vehicle that extraneous matter is adhered to a viewing-angle window part which is a part of a window of the vehicle in a viewing angle range of an onboard camera which is mounted in the vehicle such that an outside view from the vehicle is imaged from the inside of the vehicle or a camera lens which is a lens of the onboard camera, wherein the control unit is configured to perform a process of detecting the extraneous matter adhering to the viewing-angle window part or the camera lens when the vehicle is stopped, and wherein the control unit is configured not to perform the extraneous matter notification even if the extraneous matter adhering to the viewing-angle window part or the camera lens is detected when the vehicle is stopped and is not in a state in which the vehicle is predicted to be about to start traveling.

2. The vehicle driving support device according to claim 1, wherein the extraneous matter includes first extraneous matter which is assumed to be removed when the vehicle is traveling and second extraneous matter which is assumed not to be removed when the vehicle is traveling, and wherein the control unit is configured not to perform the extraneous matter notification when the vehicle is stopped and the first extraneous matter is adhered to the viewing-angle window part or the camera lens.

3. The vehicle driving support device according to claim 1, wherein the control unit is configured to perform a process of detecting the extraneous matter adhering to the viewing-angle window part or the camera lens when the vehicle is traveling, and wherein the control unit is configured to perform the extraneous matter notification when the vehicle is traveling and predetermined conditions including at least a condition that the extraneous matter has been detected are satisfied.

4. The vehicle driving support device according to claim 1, wherein the control unit is configured to perform driving support control for supporting a driver's driving operation of the vehicle based on an image captured by the onboard camera, and wherein the control unit is configured to stop the driving support control at the time of performing the extraneous matter notification when the driving support control is being performed and the extraneous matter notification is performed.

5. A vehicle driving support device comprising a control unit configured to perform extraneous matter notification for notifying an occupant of a vehicle that extraneous matter is adhered to a viewing-angle window part which is a part of a window of the vehicle in a viewing angle range of an onboard camera which is mounted in the vehicle such that an outside view from the vehicle is imaged from the inside of the vehicle or a camera lens which is a lens of the onboard camera, wherein the extraneous matter includes first extraneous matter which is assumed to be removed when the vehicle is traveling and second extraneous matter which is assumed not to be removed when the vehicle is traveling, wherein the control unit is configured to perform a process of detecting the second extraneous matter adhering to the viewing-angle window part or the camera lens when the vehicle is stopped, and wherein the control unit is configured not to perform the extraneous matter notification even if the second extraneous matter adhering to the viewing-angle window part or the camera lens is detected when the vehicle is stopped and is not in a state in which the vehicle is predicted to be about to start traveling.

6. The vehicle driving support device according to claim 5, wherein the control unit is configured not to perform a process of detecting the first extraneous matter adhering to the viewing-angle window part or the camera lens when the vehicle is stopped.

7. The vehicle driving support device according to claim 5, wherein the control unit is configured to perform the process of detecting the first extraneous matter adhering to the viewing-angle window part or the camera lens and to perform the process of detecting the second extraneous matter adhering to the viewing-angle window part or the camera lens when the vehicle is traveling, and wherein the control unit is configured to perform the extraneous matter notification when the vehicle is traveling and predetermined conditions including at least a condition that the first extraneous matter or the second extraneous matter has been detected are satisfied.

8. A vehicle driving support device comprising a control unit configured to perform extraneous matter notification for notifying an occupant of a vehicle that extraneous matter is adhered to a viewing-angle window part which is a part of a window of the vehicle in a viewing angle range of an onboard camera which is mounted in the vehicle such that an outside view from the vehicle is imaged from the inside of the vehicle or a camera lens which is a lens of the onboard camera, wherein the extraneous matter includes first extraneous matter which is assumed to be removed when the vehicle is traveling and second extraneous matter which is assumed not to be removed when the vehicle is traveling, wherein the control unit is configured not to perform a process of detecting the first extraneous matter adhering to the viewing-angle window part or the camera lens and to perform a process of detecting the second extraneous matter adhering to the viewing-angle window part or the camera lens when the vehicle is stopped, and wherein the control unit is configured not to determine whether conditions for performing the extraneous matter notification are satisfied even if the second extraneous matter adhering to the viewing-angle window part or the camera lens is detected when the vehicle is stopped and is not in a state in which the vehicle is predicted to be about to start traveling.

* * * * *